United States Patent
Okubo et al.

(10) Patent No.: US 12,498,350 B2
(45) Date of Patent: Dec. 16, 2025

(54) SYSTEMS AND METHODS FOR ASSESSING THE QUALITY OF ELECTROCATALYST-LOADED DISK ELECTRODES

(71) Applicant: Toyota Motor Engineering & Manufacturing North America, Inc., Plano, TX (US)

(72) Inventors: Keiichi Okubo, Ann Arbor, MI (US); Chen Ling, Troy, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 330 days.

(21) Appl. No.: 18/228,253

(22) Filed: Jul. 31, 2023

(65) Prior Publication Data
US 2025/0044255 A1   Feb. 6, 2025

(51) Int. Cl.
*G01N 27/48* (2006.01)
*G01N 27/30* (2006.01)
*G01N 27/416* (2006.01)

(52) U.S. Cl.
CPC .......... *G01N 27/48* (2013.01); *G01N 27/308* (2013.01); *G01N 27/4168* (2013.01)

(58) Field of Classification Search
None
See application file for complete search history.

(56) References Cited

U.S. PATENT DOCUMENTS

| | | | |
|---|---|---|---|
| 11,009,863 | B2 | 5/2021 | Bharadwaj et al. |
| 2018/0211374 | A1* | 7/2018 | Tanaka .............. G06V 10/945 |

(Continued)

FOREIGN PATENT DOCUMENTS

| | | |
|---|---|---|
| CN | 111080622 A | 4/2020 |
| JP | 6809250 B2 | 1/2021 |

OTHER PUBLICATIONS

A. Durgapal, "A Comprehensive Survey of Defect Detection in Manufacturing Products Using Deep Learning Techniques," International Research Journal of Engineering and Technology (IRJET), vol. 8, Issue 9, Sep. 2021, found at https://www.academia.edu/download/73247318/IRJET_V81978.pdf.

(Continued)

*Primary Examiner* — Miya J Cato
(74) *Attorney, Agent, or Firm* — Christopher G. Darrow; Darrow Mustafa, PC

(57) ABSTRACT

Systems and methods described herein relate to assessing the quality of electrocatalyst-loaded disk electrodes. In one embodiment, a system that assesses the quality of electrocatalyst-loaded disk electrodes receives one or more images of a disk electrode on which an electrocatalyst has been deposited to produce an electrocatalyst-loaded disk electrode. The system also processes the one or more images using a machine-learning-based model trained to generate a prediction of a Koutecky-Levich (K-L) quality assessment of the electrocatalyst-loaded disk electrode. The system also accepts or reject inclusion of the electrocatalyst-loaded disk electrode in an electrochemical experimentation process based, at least in part, on the prediction.

20 Claims, 4 Drawing Sheets

(56) References Cited

U.S. PATENT DOCUMENTS

2020/0166909 A1* 5/2020 Noone .................. G06N 20/00
2023/0334380 A1* 10/2023 Ivankin ................ G06N 20/20

OTHER PUBLICATIONS

Y. Chen et al., "Defect Inspection Technologies for Additive Manufacturing," International Journal of Extreme Manufacturing, Mar. 2021, found at https://iopscience.iop.org/article/10.1088/2631-7990/abe0d0/pdf.

S. Zaman et al., "Oxygen Reduction Electrocatalysts toward Practical Fuel Cells: Progress and Perspectives," Angewandte Chemie, 2021, found at https://www.researchgate.net/profile/Shahid-Zaman-7/publication/349605520_Oxygen_Reduction_Electrocatalysts_toward_Practical_Fuel_Cells_Progress_and_Perspective s/links/6038b39092851c4ed599a8d5/Oxygen-Reduction-Electrocatalysts-toward-Practical-Fuel-Cells-Progress-and-Perspectives.pdf.

C. Ieracitano et al., "A Novel Automatic Classification System Based on Hybrid Unsupervised and Supervised Machine Learning for Electrospun Nanofibers," IEEE/CAA Journal of Automatica Sinica, 2020, found at https://napierrepository.worktribe.com/preview/2709456/IEEE_JAS_paper_revised.pdf.

L. Meng et al., "Machine Learning in Additive Manufacturing: A Review," Springer, 2020, found at https://scholarworks.iupui.edu/bitstream/handle/1805/22982/Meng_2019_machine.pdf?sequence=1&isAllowed=y.

J. Masa et al., "Koutecky-Levich Analysis Applied to Nanoparticle Modified Rotating Disk Electrodes: Electrocatalysts pr Misinterpretation?", Springer, 2014, found at https://nru.uncst.go.ug/bitstream/handle/123456789/5255/Koutecky-Levich%20analysis%20applied%20to%20nanoparticle%20modified%20rotating%20disk%20electrodes%20Electrocatalysis%20or%20misinterpretation.pdf?sequence=1.

* cited by examiner

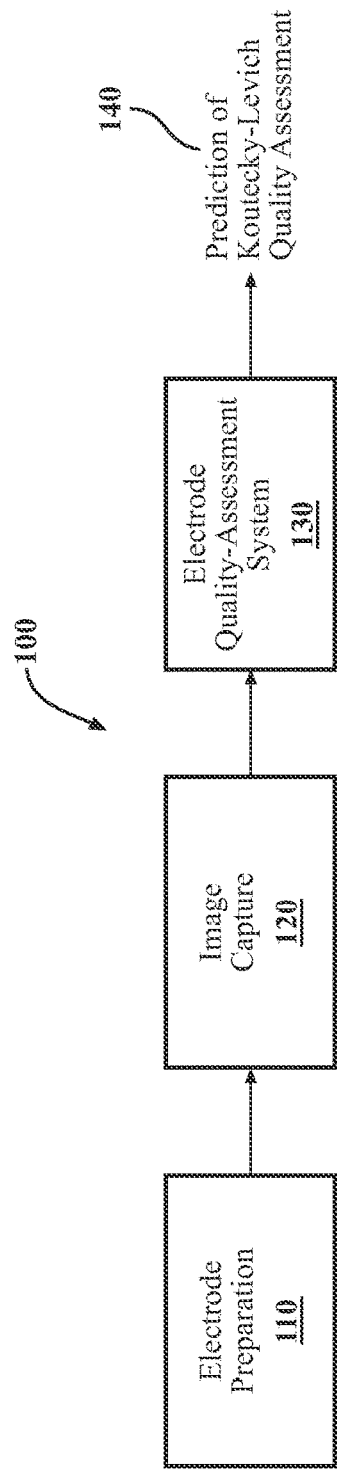
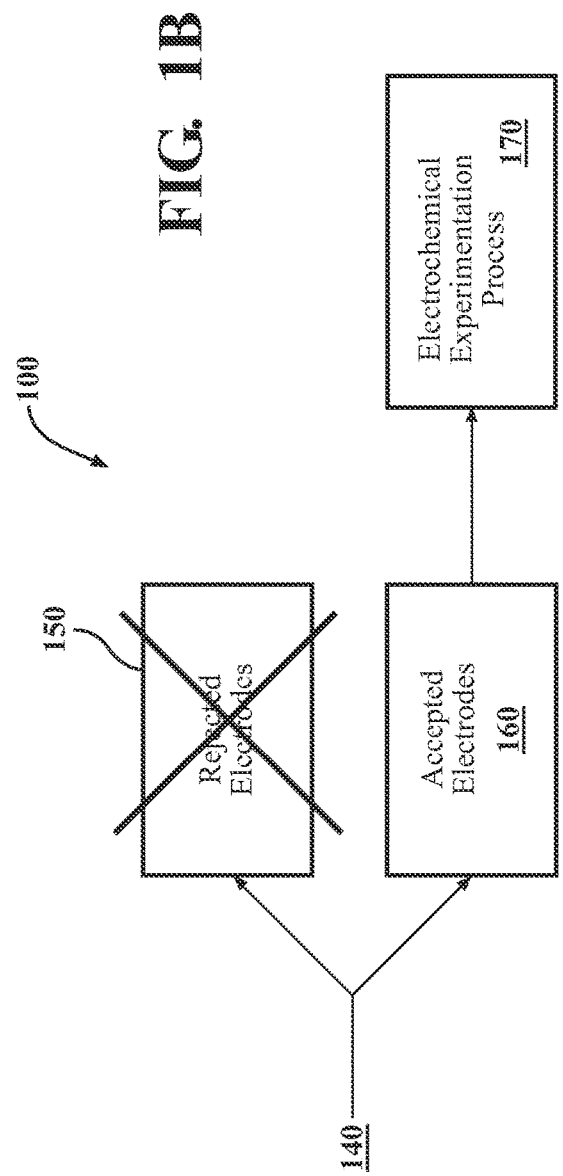

SYSTEMS AND METHODS FOR ASSESSING THE QUALITY OF ELECTROCATALYST-LOADED DISK ELECTRODES

TECHNICAL FIELD

The subject matter described herein relates in general to electrochemical experimentation and manufacturing and, more specifically, to systems and methods for assessing the quality of electrocatalyst-loaded disk electrodes.

BACKGROUND

Electrocatalysts, substances that lower the activation energy of electrochemical reactions, are an active area of ongoing research. Electrocatalysts are used in diverse applications such as water electrolysis, ammonia electrolysis, ammonia synthesis, carbon dioxide electrolysis, carbon dioxide reduction, and the manufacturing of fuel cells (e.g., hydrogen, alcohol, hydrazine, urea, and sodium borohydride fuel cells) and batteries (e.g., zinc-air, lithium-air, Li—$CO_2$, and Li—$O_2$ batteries).

A rotating disk electrode (RDE) is sometimes used to evaluate the performance and measure the fundamental properties (activity, stability, etc.) of electrocatalysts. As those skilled in the art are aware, a rotating disk electrode (RDE) is an instrument from analytical chemistry that is used in three-electrode systems for hydrodynamic voltammetry. An electrocatalyst to be evaluated is deposited on the surface of a bare disk electrode through a procedure such as drop casting or spray coating.

One important problem is that the thin coating of an electrocatalyst deposited on the surface of an electrode is not always uniform, which alters the electrocatalyst's behavior during subsequent electrochemical experimentation. Currently, avoiding the wasted time and money that results from electrochemical experimentation being performed on faulty electrocatalyst-loaded disk electrodes requires careful visual inspection by experienced experts, which is, itself, costly in both time and money.

SUMMARY

Embodiments of a system for assessing the quality of electrocatalyst-loaded disk electrodes are presented herein. In one embodiment, the system comprises a processor and a memory storing machine-readable instructions that, when executed by the processor, cause the processor to receive one or more images of a disk electrode on which an electrocatalyst has been deposited to produce an electrocatalyst-loaded disk electrode. The memory also stores machine-readable instructions that, when executed by the processor, cause the processor to process the one or more images using a machine-learning-based model trained to generate a prediction of a Koutecky-Levich (K-L) quality assessment of the electrocatalyst-loaded disk electrode. The memory also stores machine-readable instructions that, when executed by the processor, cause the processor to accept or reject inclusion of the electrocatalyst-loaded disk electrode in an electrochemical experimentation process based, at least in part, on the prediction.

Another embodiment is a non-transitory computer-readable medium for assessing the quality of electrocatalyst-loaded disk electrodes and storing instructions that, when executed by a processor, cause the processor to receive one or more images of a disk electrode on which an electrocatalyst has been deposited to produce an electrocatalyst-loaded disk electrode. The instructions also cause the processor to process the one or more images using a machine-learning-based model trained to generate a prediction of a Koutecky-Levich (K-L) quality assessment of the electrocatalyst-loaded disk electrode. The instructions also cause the processor to accept or reject inclusion of the electrocatalyst-loaded disk electrode in an electrochemical experimentation process based, at least in part, on the prediction.

Another embodiment is a method of assessing the quality of electrocatalyst-loaded disk electrodes, the method comprising receiving one or more images of a disk electrode on which an electrocatalyst has been deposited to produce an electrocatalyst-loaded disk electrode. The method also includes processing the one or more images using a machine-learning-based model trained to generate a prediction of a Koutecky-Levich (K-L) quality assessment of the electrocatalyst-loaded disk electrode. The method also includes accepting or rejecting inclusion of the electrocatalyst-loaded disk electrode in an electrochemical experimentation process based, at least in part, on the prediction.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIGS. 1A and 1B are block diagrams of an environment in which various embodiments of systems and methods for assessing the quality of electrocatalyst-loaded disk electrodes can be implemented.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Figure 2:
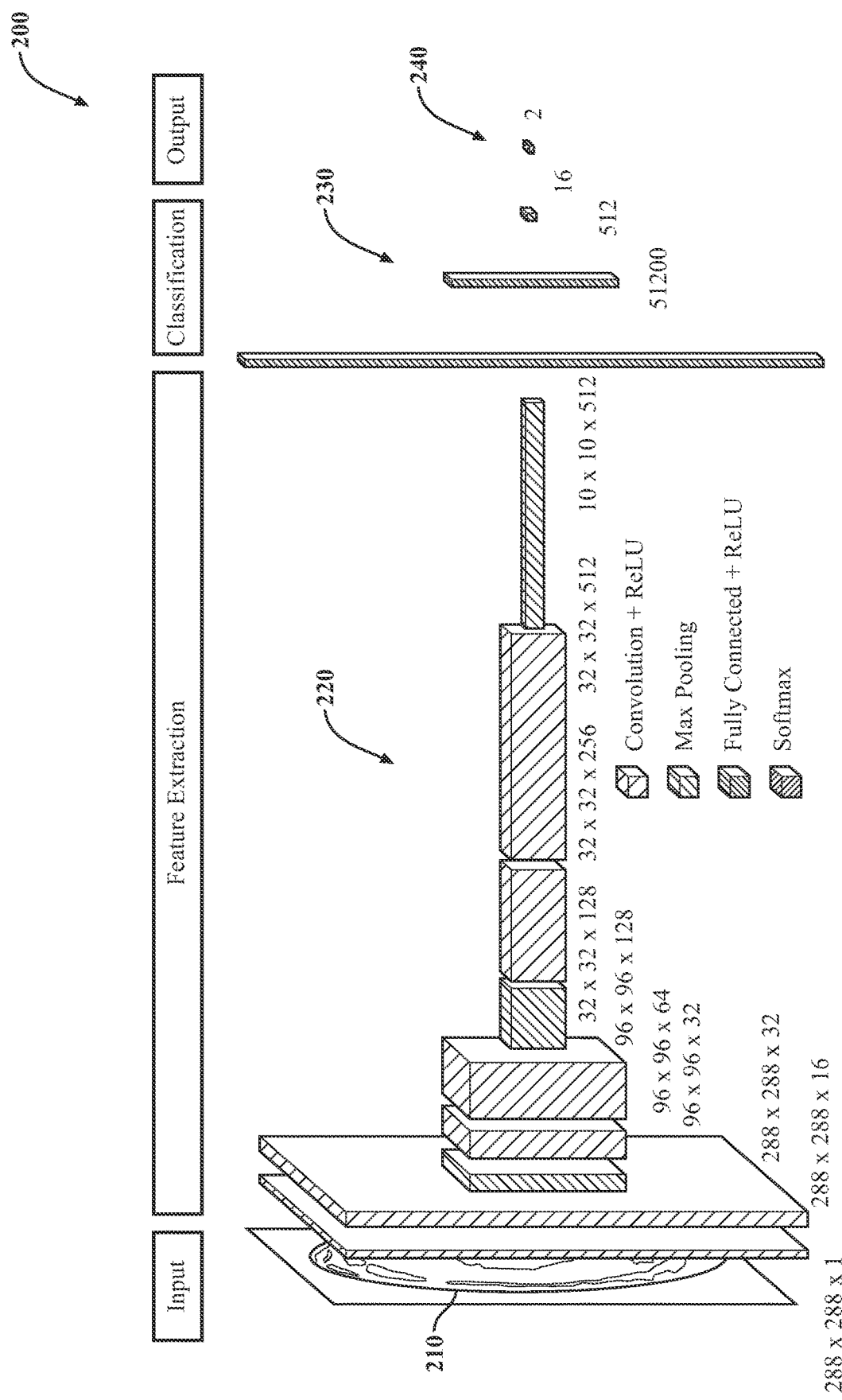
FIG. 2 is a diagram of a neural network architecture, in accordance with an illustrative embodiment of the invention.

Various embodiments of systems and methods for assessing the quality of electrocatalyst-loaded disk electrodes described herein include techniques that overcome the time and cost disadvantages of human-expert visual inspection to identify faulty electrodes and exclude them from subsequent electrochemical experimentation. Throughout this description, unless indicated otherwise, a disk electrode on the surface of which an electrocatalyst has been deposited—an "electrocatalyst-loaded disk electrode"—is referred to simply as an "electrode." To distinguish an electrocatalyst-loaded disk electrode from a disk electrode on which an electrocatalyst has not yet been deposited, the term "bare disk electrode" is used to refer to the latter.

In various embodiments of an electrode quality-assessment system, machine learning techniques are employed to identify electrodes with anomalies that render them unsuitable for electrochemical experimentation. More specifically, prior to electrochemical experimentation, images (photographs) of the electrodes are processed by a machine-learning-based model that has been trained to predict the results of a Koutecky-Levich (K-L) quality assessment of the electrode. As those skilled in the art are aware, in the context of machine-learning-based models, the term "predicting" is often used to mean "estimating," and those two terms are herein used interchangeably in reference to the ultimate output of the machine-learning-based model. As those skilled in the art are also aware, a K-L quality assessment is directed to determining the extent to which the surface of the electrode is coated (covered) by the deposited electrocatalyst. This figure of merit, discussed in greater detail below, is sometimes expressed as a real number between zero and unity, inclusive, or as a percentage, where unity or 100 percent corresponds to complete coverage of the electrode surface. The electrode quality-assessment system accepts or rejects a given electrode for an electrochemical experimentation process based, at least in part, on the prediction generated by the machine-learning-based model.

In some applications, the electrochemical experimentation process of which the various embodiments described herein are a part is fully or at least partially automated through the use of artificial intelligence and robotics.

FIGS. 1A and 1B are block diagrams of an environment 100 in which various embodiments of systems and methods for assessing the quality of electrodes can be implemented. Referring to FIG. 1A, during electrode preparation 110, an electrocatalyst is deposited on the surface of a bare disk electrode through a procedure such as, without limitation, drop casting or spray coating. As explained above, the resulting electrocatalyst coating might not completely cover the surface of the electrode, and the coating might not be uniform. Therefore, it is desirable to efficiently and automatically assess the quality of the electrocatalyst coating before time and resources are wasted on a faulty electrode during subsequent electrochemical experimentation. Various embodiments of an electrode quality-assessment system 130 described herein address this need.

Referring again to FIG. 1A, images of the electrodes are generated during image capture 120. In some embodiments, the images of the electrodes are microscopic images. In those embodiments, the images are captured using, for example, an optical microscope, transmission electron microscopy, or a scanning electron microscope. In other embodiments, the images are captured by a digital camera or other imaging device without the aid of a microscope. In some of those embodiments, the digital camera is integrated with a smartphone.

In some embodiments, electrode quality-assessment system 130 includes a machine-learning-based model that has been trained to process one or more images obtained via the image capture 120 process to generate a prediction (estimate) 140 of the results of a K-L quality assessment of an electrode. Such a machine-learning-based assessment can be generated rapidly and in a non-destructive manner to identify faulty electrodes and exclude them from later electrochemical experimentation. Weeding out the faulty electrodes before electrochemical experimentation saves both time and money.

As those skilled in the art are aware, the uniformity of an electrocatalyst coating on an electrode can be quantified electrochemically by measuring the slope of a K-L plot. The K-L equation models the measured electric current at an electrode from an electrochemical reaction in relation to the kinetic activity and the mass transport of the reactants. In the case of a rotating disk electrode (RDE), the rotation speed of the electrode is controlled to supply a certain quantity of reactants. The RDE is used to extract the kinetic current from the measured current.

In some embodiments, ground-truth data obtained from electrochemical experimentation (i.e., electrochemical K-L quality assessments) is used to train the machine-learning-based model in a supervised manner. For example, in some embodiments, images of electrodes are annotated with ground-truth quality data based on electrochemical K-L quality assessments. How this ground-truth data is acquired is described in greater detail below. In some embodiments, data-augmentation techniques are used to expand the training set. For example, images in the training set can be randomly rotated, flipped in random directions, shifted, or sheared to generate a more varied training set.

In some embodiments, a predetermined quality threshold (e.g., 93.5 percent, in one embodiment) corresponding to the extent to which the electrocatalyst covers the surface of the electrode is selected. In these embodiments, the prediction 140 is a binary classification of the electrode as either "acceptable" or "unacceptable" for electrochemical experimentation based on whether the estimated extent to which the surface of the electrode is covered by the electrocatalyst exceeds the predetermined quality threshold.

In other embodiments, the prediction 140 is an estimate of the extent to which the surface of the disk electrode is covered by the electrocatalyst (e.g., a real number between zero and unity, inclusive, or a percentage, as discussed above), and the electrode is accepted or rejected for electrochemical experimentation based on whether the estimate of the extent to which the surface of the disk electrode is covered by the electrocatalyst exceeds a predetermined tunable quality threshold. That is, in these embodiments, the quality threshold can be varied to suit a particular application.

In both embodiments just described, electrode quality-assessment system 130 accepts or rejects a given electrode for inclusion in an electrochemical experimentation process based, at least in part, on the prediction 140. The electrodes that are accepted by electrode quality-assessment system 130 are experimented upon during the electrochemical experimentation process.

A variety of different deep learning or reinforcement learning architectures can be employed in implementing the machine-learning-based model of electrode quality-assessment system 130. For example, in some embodiments, a multi-layered convolutional neural network (CNN) is employed, as illustrated in FIG. 2.

FIG. 2 is a diagram of a neural network architecture 200, in accordance with an illustrative embodiment of the invention. As just mentioned, the neural network architecture 200 shown in FIG. 2 is a multi-layered CNN. As indicated in FIG. 2, an image 210 of an electrode is input to the CNN, which includes feature-extraction layers 220, classification layers 230, and output layers 240. In this particular embodiment, the feature-extraction layers 220 include convolution-plus-rectified-linear-unit (ReLU) layers and max-pooling layers. The classification layers 230 include fully-connected-plus-ReLU layers. In the particular embodiment shown in FIG. 2, the output layers 240 include a two-output Softmax-algorithm layer that outputs the binary classification ("acceptable" or "unacceptable") discussed above. The neural network architecture 200 shown in FIG. 2 is merely one example of a neural-network architecture that can be used to implement the machine-learning-based model of electrode quality-assessment system 130.

Referring next to FIG. 1B, this figure illustrates that rejected electrodes 150 are not included in a subsequent electrochemical experimentation process 170, whereas accepted electrodes 160 are included (i.e., they are experimented upon electrochemically). A significant advantage of the embodiments of an electrode quality-assessment system 130 described herein is that faulty electrodes can be identified and removed to avoid wasting time and resources on them during the electrochemical-experimentation phase.

Techniques for acquiring ground-truth data for use in training the machine-learning-based model of electrode quality-assessment system 130 will next be described. To quantify the quality of electrodes, electrochemical measurements are conducted to estimate the K-L slope from linear-sweep voltammogram experiments. As discussed above, the K-L equation describes the relation of the measured current and the kinetic current in an electrochemical process. This equation states that the electric current from an electrode is determined by the kinetics of a catalytic reaction and the mass transport of the reactants, the latter of which is controlled by the rotation speed of the RDE:

$$\frac{1}{i} = \frac{1}{i_K} + \left(\frac{1}{0.620 nFAD^{\frac{2}{3}}v^{-\frac{1}{6}}C}\right)\omega^{-\frac{1}{2}}, \quad (1)$$

where i and $i_K$ are the measured and kinetic currents from the electrochemical reactions, respectively, n is the number of moles of electrons transferred in the half reaction; F is the Faraday constant; D, v, and C are the diffusion coefficient, kinematic viscosity, and the analyte concentration, respectively, $\omega$ is the angular rotation rate of the electrode; and A is the active electrode area.

The K-L slope describes the linear dependence between; 1/i and $\omega^{1/2}$ by encoding the physical properties of A, D, v, and C:

$$k_{KL} = \frac{1}{0.620 nFAD^{\frac{2}{3}}v^{-\frac{1}{6}}C} = 1.613 n^{-1} F^{-1} D^{-\frac{2}{3}} v^{\frac{1}{6}} C^{-1} A^{-1}. \quad (2)$$

By controlling the experimentation under a constant diffusion coefficient, kinematic viscosity, and analyte concentration, $k_{KL}$ is affected only by the active electrode area A. For example, in an oxygen reduction reaction (ORR) used in some fuel-cell applications, A is directly related to the electrocatalyst coating, since the uncoated glassy carbon substrates are electrochemically inactive. Therefore, the quality of the electrode can be quantified through the ratio of the active electrode area A to the entire electrode area $A_0$:

$$\theta_{KL} = \alpha k_{KL}^{-1}, \quad (3)$$

where the constant $\alpha$ is defined as follows:

$$\alpha = 1.613 n^{-1} F^{-1} D^{-\frac{2}{3}} v^{\frac{1}{6}} C^{-1} A_0^{-1}. \quad (4)$$

The feasibility of the above approach has been verified through analysis of a sweep voltammogram measured at different rotation speeds for platinum disk electrodes. In the ORR example referenced above (more specifically, ORR in 0.1 M perchloric acid), the following relationship for the electrochemical systems was obtained:

$$\theta_{KL} = 0.41 A_0^{-1} k_{KL}^{-1}. \quad (5)$$

In the above discussion of acquiring ground-truth data for training the machine-learning-based model, the quantity $\theta_{KL}$ is the figure of merit mentioned above that measures the extent to which the surface of the electrode is covered by the electrocatalyst under study. As discussed above, this figure of merit can be expressed as a real number between zero and unity, inclusive, or it can be expressed as a percentage, depending on the embodiment.

In some embodiments, the electrocatalyst includes Pt nanoparticles that are used for at least an ORR.

As discussed above, in some embodiments, data-augmentation techniques are used to expand the training set of images 210. For example, images 210 in the training set can be randomly rotated, flipped in random directions, shifted, or sheared to generate a more varied training set.

Figure 3:
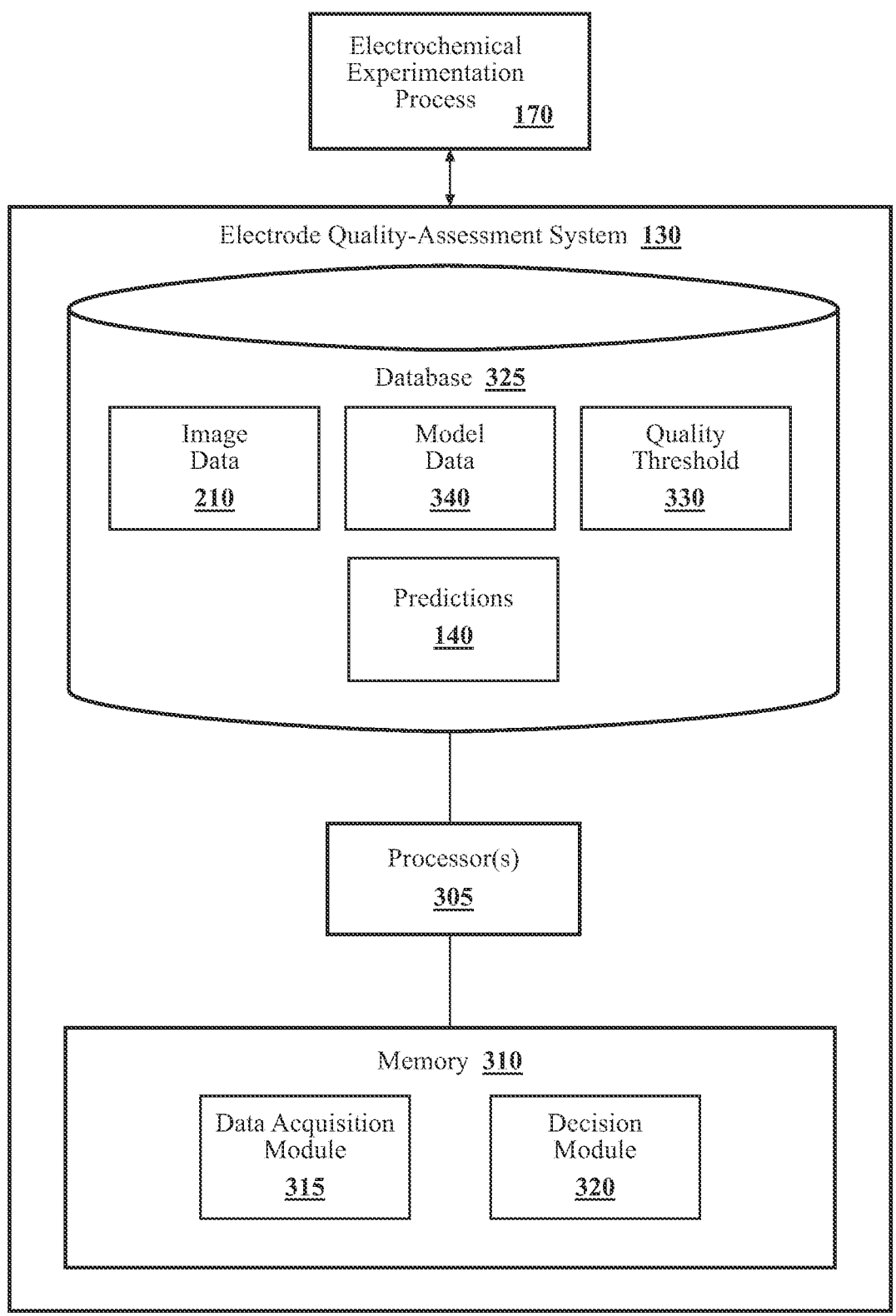
FIG. 3 is a block diagram of an electrode quality-assessment system, in accordance with an illustrative embodiment of the invention.

FIG. 3 is a block diagram of an electrode quality-assessment system 130, in accordance with an illustrative embodiment of the invention. In FIG. 3, electrode quality-assessment system 130 includes one or more processors 305 to which a memory 310 is communicably coupled. Memory 310 stores a data acquisition module 315 and a decision module 320. The memory 310 is a random-access memory (RAM), read-only memory (ROM), a hard-disk drive, a flash memory, or other suitable non-transitory memory for storing the modules 315 and 320. The modules 315 and 320 are, for example, machine-readable instructions that, when executed by the one or more processors 305, cause the one or more processors 305 to perform the various functions disclosed herein.

As shown in FIG. 3, electrode quality-assessment system 130 can store various kinds of data in a database 325. For example, electrode quality-assessment system 130 can store images 210 (labeled "image data 210" in FIG. 3) captured during the image capture 120 process. Database 325 can also store model data 340, a quality threshold 330, and predictions 140. Model data 340 includes a variety of different kinds of data associated with the machine-learning-based model discussed above, including, without limitation, model parameters (weights, etc.), hyperparameters, intermediate results of computations, and training-related data. Quality threshold 330 is the threshold for the estimated $\theta_{KL}$ discussed above. As also discussed above, in some embodiments, quality threshold 330 is tunable (adjustable).

As depicted in FIG. 3, electrode quality-assessment system 130 can communicate (e.g., over a computer network) with an electrochemical experimentation process 170. That is, electrode quality-assessment system 130 can communicate with other electronic devices and systems pertaining to an electrochemical experimentation process 170.

Data acquisition module 315 generally includes instructions that, when executed by the one or more processors 305, cause the one or more processors 305 to receive one or more images 210 of an electrode. For example, in some embodiments, data acquisition module 315 receives the one or more images of the electrode from the image capture 120 process discussed above. As discussed above, in some embodiments, the images 210 of the electrodes are microscopic images. In those embodiments, the images are captured using, for example, an optical microscope, transmission electron microscopy, or a scanning electron microscope. In other embodiments, the images are captured by a digital camera or other imaging device without the aid of a microscope. In some of those embodiments, the digital camera is integrated with a smartphone. Decision module 320 generally includes instructions that, when executed by the one or more processors 305, cause the one or more processors 305 to process the one or more images 210 using a machine-learning-based model trained to generate a prediction 140 of a K-L quality assessment of the electrode. The one or more processors 305 and associated computer hardware, in combination with decision module 320, correspond to the machine-learning-based model discussed herein. The principles and equations pertaining to a K-L quality assessment, in the electrochemical-experimentation context, are discussed above in connection with how ground-truth quality-assessment data is produced to support supervised training of the machine-learning-based model. As explained above, during the training phase, images 210 of electrodes can be annotated with ground-truth quality-assessment data to support supervised training of a neural-network model such as the CNN discussed above in connection with FIG. 2. In other embodiments, different neural-network architectures are employed.

Decision module 320 also includes instructions that, when executed by the one or more processors 305, cause the one or more processors 305 to accept or reject inclusion of the electrode being assessed in an electrochemical experimentation process 170 based, at least in part, on the prediction 140. As discussed above, rejected electrodes are excluded from the electrochemical experimentation process 170, and accepted electrodes are physically experimented upon during the electrochemical experimentation process 170.

As explained above, in some embodiments, a predetermined quality threshold (e.g., 93.5 percent, in one embodiment) corresponding to the extent to which the electrocatalyst covers the surface of the electrode is selected (refer to the discussion of the figure of merit $\theta_{KL}$ above). In these embodiments, decision module 320 outputs a prediction 140 that is a binary classification of the electrode as either "acceptable" or "unacceptable" for electrochemical experimentation based on whether the estimated extent to which the surface of the electrode is covered by the electrocatalyst exceeds the predetermined quality threshold. See FIG. 2 and its associated description for an example of a neural-network implementation that outputs a binary-classification prediction 140.

In other embodiments, decision module 320 outputs a prediction 140 that is an estimate of the extent to which the surface of the disk electrode is covered by the electrocatalyst (i.e., an estimate of $\theta_{KL}$), and decision module 320 accepts or rejects the electrode for electrochemical experimentation based on whether the estimate of the extent to which the surface of the electrode is covered by the electrocatalyst exceeds a predetermined tunable quality threshold. As discussed above, in such embodiments, the quality threshold can be adjusted to suit a particular application.

In both embodiments just mentioned, decision module 320 accepts or rejects a given electrode for inclusion in an electrochemical experimentation process based, at least in part, on the prediction 140.

Figure 4:
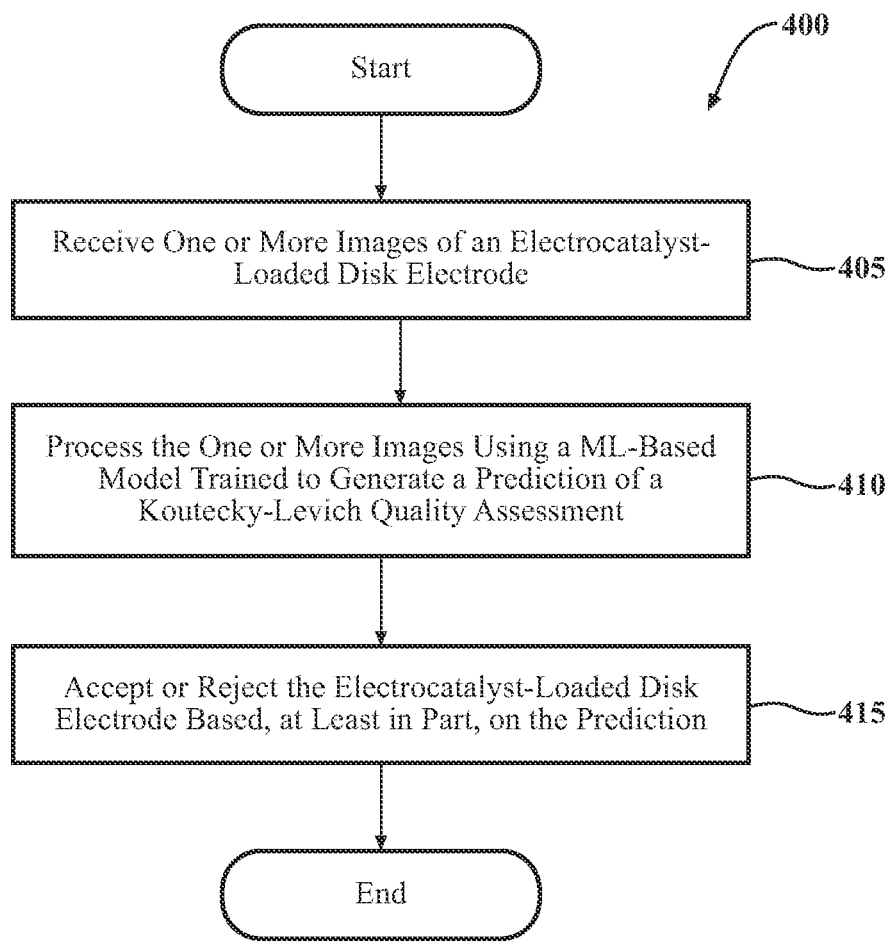
FIG. 4 is a flowchart of a method of assessing the quality of electrocatalyst-loaded disk electrodes, in accordance with an illustrative embodiment of the invention.

FIG. 4 is a flowchart of a method 400 of assessing the quality of electrocatalyst-loaded disk electrodes, in accordance with an illustrative embodiment of the invention. Method 400 will be discussed from the perspective of the electrode quality-assessment system 130 in FIGS. 1 and 3. While method 400 is discussed in combination with electrode quality-assessment system 130, it should be appreciated that method 400 is not limited to being implemented within electrode quality-assessment system 130, but electrode quality-assessment system 130 is instead one example of a system that may implement method 400.

At block 405, data acquisition module 315 receives one or more images 210 of an electrode. As explained above, in some embodiments, data acquisition module 315 receives the one or more images of the electrode from the image capture 120 process (refer to FIG. 1). As also explained above, in some embodiments, the images 210 of the electrodes are microscopic images. In those embodiments, the images are captured using, for example, an optical microscope, transmission electron microscopy, or a scanning electron microscope. In other embodiments, the images are captured by a digital camera or other imaging device without the aid of a microscope. In some of those embodiments, the digital camera is integrated with a smartphone.

At block 410, decision module 320 processes the one or more images 210 using a machine-learning-based model ("ML-based model" in FIG. 4) trained to generate a prediction 140 of a K-L quality assessment of the electrode being evaluated. The principles and equations pertaining to a K-L quality assessment, in the electrochemical-experimentation context, are discussed above in connection with how ground-truth quality-assessment data is produced to support supervised training of the machine-learning-based model. As explained above, during the training phase, images 210 of electrodes can be annotated with ground-truth quality-assessment data to support supervised training of a neural-network model such as the CNN discussed above in connection with FIG. 2.

At block 415, decision module 320 accepts or rejects inclusion of the electrode in an electrochemical experimentation process 170 based, at least in part, on the prediction 140. As discussed above, rejected electrodes are excluded from the electrochemical experimentation process 170, and accepted electrodes are physically experimented upon during the electrochemical experimentation process 170.

As explained above, in some embodiments, a predetermined quality threshold (e.g., 93.5 percent, in one embodiment) corresponding to the extent to which the electrocatalyst covers the surface of the electrode is selected (refer to the discussion of the figure of merit $\theta_{KL}$ above). In these embodiments, decision module 320 outputs a prediction 140 that is a binary classification of the electrode as either "acceptable" or "unacceptable" for electrochemical experimentation based on whether the estimated extent to which the surface of the electrode is covered by the electrocatalyst exceeds the predetermined quality threshold.

In other embodiments, decision module 320 outputs a prediction 140 that is an estimate of the extent to which the surface of the disk electrode is covered by the electrocatalyst (i.e., an estimate of $\theta_{KL}$), and decision module 320 accepts or rejects the electrode for electrochemical experimentation based on whether the estimate of the extent to which the surface of the electrode is covered by the electrocatalyst exceeds a predetermined tunable quality threshold. As discussed above, in such embodiments, the quality threshold can be adjusted to suit a particular application.

In both embodiments just mentioned, decision module 320 accepts or rejects a given electrode for inclusion in an electrochemical experimentation process 170 based, at least in part, on the prediction 140.

As mentioned above, the electrochemical experimentation process 170 can pertain to one or more of water electrolysis, ammonia electrolysis, ammonia synthesis, carbon dioxide electrolysis, carbon dioxide reduction, and the manufacturing of fuel cells and batteries. As also mentioned above, in some implementation environments, the electrochemical experimentation process 170 is fully automated through the use of artificial intelligence and robots. In other embodiments, the electrochemical experimentation process 170 is at least partially automated.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The components described above can be realized in hardware or a combination of hardware and software and can be realized in a centralized fashion in one processing system or in a distributed fashion where different elements are spread across several interconnected processing systems. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++, Python, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

As used herein, "cause" or "causing" means to make, command, instruct, and/or enable an event or action to occur or at least be in a state where such event or action may occur, either in a direct or indirect manner.

Aspects herein can be embodied in other forms without departing from the spirit or essential attributes thereof. Accordingly, reference should be made to the following claims rather than to the foregoing specification, as indicating the scope hereof.

What is claimed is:

1. A system for assessing quality of electrocatalyst-loaded disk electrodes, the system comprising:
   a processor, and
   a memory storing machine-readable instructions that, when executed by the processor, cause the processor to:
      receive one or more images of a disk electrode on which an electrocatalyst has been deposited to produce an electrocatalyst-loaded disk electrode;

process the one or more images using a machine-learning-based model trained to generate a prediction of a Koutecky-Levich (K-L) quality assessment of the electrocatalyst-loaded disk electrode; and accept or reject inclusion of the electrocatalyst-loaded disk electrode in an electrochemical experimentation process based, at least in part, on the prediction.

2. The system of claim 1, wherein the prediction pertains to an extent to which a surface of the disk electrode is covered by the electrocatalyst.

3. The system of claim 2, wherein the prediction is a classification of the electrocatalyst-loaded disk electrode as one of acceptable and unacceptable based on whether an estimate of the extent to which the surface of the disk electrode is covered by the electrocatalyst exceeds a predetermined threshold.

4. The system of claim 2, wherein the prediction is an estimate of the extent to which the surface of the disk electrode is covered by the electrocatalyst and the electrocatalyst-loaded disk electrode is accepted or rejected based on whether the estimate of the extent to which the surface of the disk electrode is covered by the electrocatalyst exceeds a predetermined tunable threshold.

5. The system of claim 1, wherein the one or more images are microscopic images captured using one of an optical microscope, transmission electron microscopy, and a scanning electron microscope.

6. The system of claim 1, wherein the electrocatalyst includes Pt nanoparticles that are used for at least an oxygen reduction reaction (ORR).

7. The system of claim 1, wherein the electrochemical experimentation process pertains to one or more of water electrolysis, ammonia electrolysis, ammonia synthesis, carbon dioxide electrolysis, carbon dioxide reduction, the manufacturing of fuel cells, and the manufacturing of batteries.

8. The system of claim 1, wherein the electrochemical experimentation process is fully automated.

9. A non-transitory computer-readable medium for assessing quality of electrocatalyst-loaded disk electrodes and storing instructions that, when executed by a processor, cause the processor to:

receive one or more images of a disk electrode on which an electrocatalyst has been deposited to produce an electrocatalyst-loaded disk electrode;

process the one or more images using a machine-learning-based model trained to generate a prediction of a Koutecky-Levich (K-L) quality assessment of the electrocatalyst-loaded disk electrode; and accept or reject inclusion of the electrocatalyst-loaded disk electrode in an electrochemical experimentation process based, at least in part, on the prediction.

10. The non-transitory computer-readable medium of claim 9, wherein the prediction pertains to an extent to which a surface of the disk electrode is covered by the electrocatalyst.

11. The non-transitory computer-readable medium of claim 10, wherein the prediction is a classification of the electrocatalyst-loaded disk electrode as one of acceptable and unacceptable based on whether an estimate of the extent to which the surface of the disk electrode is covered by the electrocatalyst exceeds a predetermined threshold.

12. The non-transitory computer-readable medium of claim 10, wherein the prediction is an estimate of the extent to which the surface of the disk electrode is covered by the electrocatalyst and the electrocatalyst-loaded disk electrode is accepted or rejected based on whether the estimate of the extent to which the surface of the disk electrode is covered by the electrocatalyst exceeds a predetermined tunable threshold.

13. A method, comprising:

receiving one or more images of a disk electrode on which an electrocatalyst has been deposited to produce an electrocatalyst-loaded disk electrode;

processing the one or more images using a machine-learning-based model trained to generate a prediction of a Koutecky-Levich (K-L) quality assessment of the electrocatalyst-loaded disk electrode; and accepting or rejecting inclusion of the electrocatalyst-loaded disk electrode in an electrochemical experimentation process based, at least in part, on the prediction.

14. The method of claim 13, wherein the prediction pertains to an extent to which a surface of the disk electrode is covered by the electrocatalyst.

15. The method of claim 14, wherein the prediction is a classification of the electrocatalyst-loaded disk electrode as one of acceptable and unacceptable based on whether an estimate of the extent to which the surface of the disk electrode is covered by the electrocatalyst exceeds a predetermined threshold.

16. The method of claim 14, wherein the prediction is an estimate of the extent to which the surface of the disk electrode is covered by the electrocatalyst and the electrocatalyst-loaded disk electrode is accepted or rejected based on whether the estimate of the extent to which the surface of the disk electrode is covered by the electrocatalyst exceeds a predetermined tunable threshold.

17. The method of claim 13, wherein the one or more images are microscopic images captured using one of an optical microscope, transmission electron microscopy, and a scanning electron microscope.

18. The method of claim 13, wherein the electrocatalyst includes Pt nanoparticles that are used for at least an oxygen reduction reaction (ORR).

19. The method of claim 13, wherein the electrochemical experimentation process pertains to one or more of water electrolysis, ammonia electrolysis, ammonia synthesis, carbon dioxide electrolysis, carbon dioxide reduction, and the manufacturing of fuel cells, and the manufacturing of batteries.

20. The method of claim 13, wherein the electrochemical experimentation process is fully automated.

* * * * *